United States Patent Office 3,441,744
Patented Apr. 29, 1969

3,441,744
SYNCHRONIZED CONTROL SYSTEM FOR SLOW MOVING EQUIPMENT
David S. Noble, Carpinteria, Calif., assignor to Noble Electronics Inc., Carpinteria, Calif., a corporation of California
Filed Feb. 19, 1968, Ser. No. 706,430
Int. Cl. G05b 13/02, 15/02, 19/16
U.S. Cl. 307—40                                        10 Claims

ABSTRACT OF THE DISCLOSURE

A cyclic electronic circuit, such as a binary counter, is operated in synchronism with a cylic high speed storage device, such as a magnetic drum, sonic delay line or shift registers operated in a cyclic manner, to generate different strobe pulses for each and any or all of its states corresponding to any desired points in the cycle of the storage. The cyclic circuit is synchronized with the storage by means of a reference or timing pulse channel in or coupled to the storage unit in such a manner that pulses are added to the timing pulses or timing pulses are subtracted from the series of timing pulses in accordance with a slow speed pulse generator coupled to the slow moving physical equipment. The movement of the slow moving physical equipment will thus cause a precession of the cyclic circuit and its associated strobe pulses with respect to the storage unit.

---

This invention relates to a control system and particularly to an electronic control system that synchronizes electronic circuitry with slow moving equipment such as conveyor belts and the like.

In electronic control systems for industrial uses, the problem frequently arises in which it is necessary to synchronize electronic circuitry with slow moving equipment. Conventionally, this has required a slow moving storage such as a magnetic tape which is mechanically synchronized or a shift register circuit configuration that can be actuated electronically in step with the belt, for example. It has been found that the slow moving storage systems are cumbersome, expensive and rather complicated and, accordingly, have proven to be less than reliable. Generally, these conventional systems also require a separate memory track or tape for each actuator to be energized in the system. It should be quite obvious that an electronic control system that is physically simpler, cheaper, smaller, or combinations of these features would be a significant advancement of the art.

It is therefore an object of this invention to provide an improved control system.

It is another object of the present invention to provide a simpler, cheaper and smaller electronic control system.

It is still another object of the invention to provide a control system for industrial purposes that does not use a slow moving storage.

It is yet another object of the present invention to provide a control system that does not require a separate memory track or tape for each actuator to be energized in the system.

It is a further object of the invention to provide a more reliable electronic control system that utilizes a high speed storage circuit cyclically operated and synchronized to a slow speed mechanical device.

Briefly, the synchronized control system in accordance with the principles of the invention includes a cyclic storage unit, a cyclic electronic circuit that generates different strobe pulses for any of its states corresponding to any desired points in the cycle of the storage, a slow speed pulse generator coupled to a slow moving physical unit, and timing pulse circuitry coupled to the storage unit, to the cyclic electronic circuit and to the slow speed pulse generator to cause a precession of the cyclic circuit and its associated strobe pulses with respect to the storage unit by the addition or subtraction of a timing pulse to the cyclic circuit.

The invention and specific embodiments thereof will be described hereinafter by way of example and with reference to the accompanying drawings wherein like reference numerals refer to like elements or parts and in which.

Figure 1:
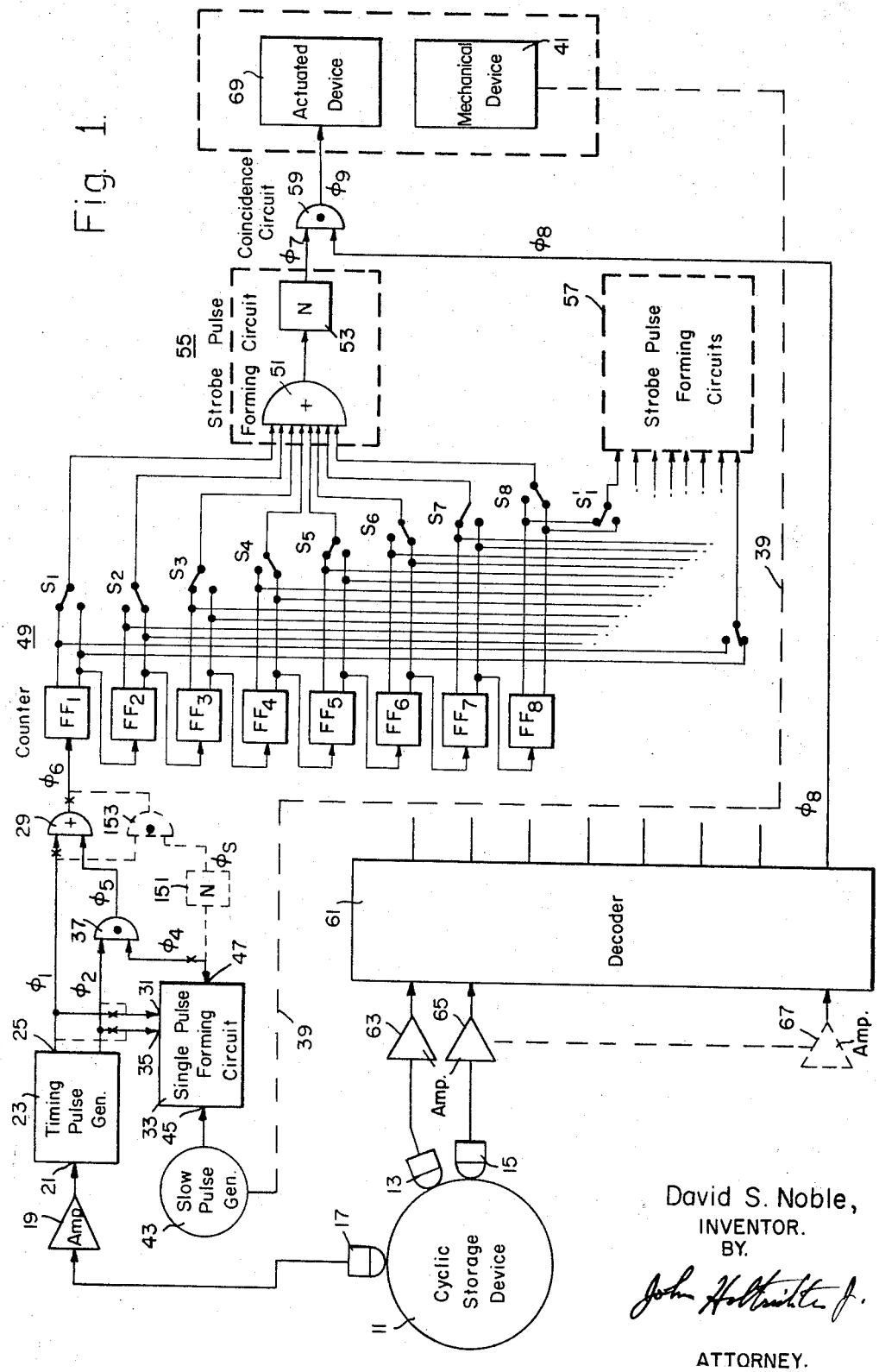
FIG. 1 is a schematic block diagram of the synchronized control system in accordance with the principles of the invention operating in an addition mode.

Referring first to FIG. 1, the synchronized control system in accordance with the principles of the invention includes a relatively high speed cyclic storage device such as a magnetic drum 11, or a sonic delay line, shift register or other suitable storage arrangements operating in a cyclic manner. The magnetic drum 11 as shown may have multiple memory tracks, each having a plurality of stored information segments pre-recorded thereon which information is received from each such track by conventional means such as read heads 13 and 15, in this case magnetically coupled to separate tracks on the magnetic drum 11.

The system according to the invention also includes clock or timing circuitry which may be independent of the storage means or, as shown in FIG. 1, the magnetic drum 11, for example, may include a clock or timing track that is read by a timing read head 17. As an alternative, the timing circuitry may, as noted, be a separate master oscillator and suitable pulse forming circuits as well known in the art and, therefore, not shown. The timing information as read by the read head 17 may be amplified by an amplifier 19 before being coupled to the input 21 of a timing pulse generator 23 which will be described in more detail later.

The timing pulse generator 23 includes a first output terminal 25 and a second output terminal 27 providing, respectively, a first timing signal $\phi_1$ and a second timing signal $\phi_2$. The timing signals are synchronized with the timing information received at the input 21 to the timing pulse generator 23, but these timing signals, $\phi_1$ and $\phi_2$, are approximately 180° out of phase with each other.

The first timing signal $\phi_1$ is coupled to a conventional "or" gate 29 and to a first input terminal 31 of a single pulse forming circuit 33. However, it is to be understood that the principles of the invention are applicable to any type of logical system and are not limited to binary systems or to only positive logical systems. The second timing signal $\phi_2$ is coupled to a second input terminal 35 of the single pulse forming circuit 33 and to a conventional "and" gate 37, all as part of an anticoincident arrangement as will be explained later.

As can be seen in FIG. 1, a mechanical linkage as represented by dashed line 39 coupled a mechanical device 41, such as a conveyor belt for example, to a slow pulse generator 43 so that the number of slow speed pulses generated by the slow pulse generator 43 will be governed by the physical motion of the mechanical device 41. Thus, where the conveyor belt, for example, is not moving, no slow speed pulses will be generated.

The slow speed pulses, when generated, are related by number with respect to the speed of the mechanical device or conveyor belt in this case and are coupled to a third input terminal 45 of the single pulse forming circuit 33. The output signal of the single pulse forming circuit is provided at an output terminal 47 and thus provides an anticoincident signal $\phi_4$ to another input of the "and" gate 37. The output of the anticoincidence "and" gate 37 depends upon the coincidence and polarity of the second timing signal $\phi_2$ and the anticoincident signal $\phi_4$ and is here shown as precession signal $\phi_5$ coupled to another input of the "or" gate 29.

The "or" gate 29 provides a counting signal $\phi_6$ that is fed to a cyclic electronic circuit such as a conventional binary counter 49. The counter 49 may take a multitude of different forms and is not to be limited to a binary counter or to one consisting of conventional single input flip-flops $FF_1$–$FF_8$, as shown. As just mentioned, the flip-flops shown are well known in the art generally referred to as trigger or complementing flip-flops, where any input pulse results in a change in state of the flip-flop.

Each flip-flop stage of the counter 49 includes two output terminals, one of which is coupled to the input of a subsequent series connected flip-flop stage, except for the last stage. Also, by means of switches $S_1$–$S_8$, for example, either output of each flip-flop stage may be selected to be coupled to one of the multiple inputs to a conventional multiple input "or" gate 51. The output of the "or" gate 51 is coupled to a conventional inverted circuit 53 which together comprise what may be called a strobe pulse forming circuit 55. Again, the strobe circuit 55 need not only be comprised of such elements as the "or" gate 51 and the inverted 53, but any similarly functioning circuitry may be substituted therefor. Thus, it can be seen that each flip-flop stage has an output coupled to an input of the "or" gate 51 and the particular polarity of the various inputs to this "or" gate at any instant of time will depend upon the state of each particular flip-flop stage $FF_1$–$FF_8$ and the selection made by the switches $S_1$–$S_8$. It should also be noted that the output of each of the flip-flop stages is coupled in parallel to additional strobe pulse forming circuits through similar double-pole switches not here shown for the sake of clarity. Therefore, it should be understood that although the principles of the invention are applicable to any desired number of flip-flop stages and strobe pulse forming circuits, only flip-flops $FF_1$–$FF_8$ and strobe circuit 55 are illustrated for convenience of explanation and additional stages and strobe circuits may be included as, for example, indicated by a dotted strobe circuit 57. The number of such flip-flop stages and strobe circuits actually utilized will be governed by principles to be explained later.

The output of each strobe pulse forming circuit is what will be called a strobe signal $\phi_7$ which is coupled to an input of a concidence circuit such as a coincidence "and" gate 59. Although only one coincidence circuit is shown, there will be a similar circuit for each strobe pulse forming circuit utilized in the system. The other input signal to the coincidence circuit 59 is an information signal $\phi_8$ that is provided by a conventional binary decoder circuit such as a diode matrix decoder 61 that may be coupled through channel amplifiers 63 and 65 to the respective information read heads 13 and 15. It should again be understood that although the principles of the invention are applicable to any desired number of information tracks recorded on the cyclic storage device 11 and corresponding read heads and amplifiers, only two tracks, read heads 13 and 15 and amplifiers 63 and 65 are shown for convenience of explanation and additional tracks, read heads and amplifiers may be included as, for example, indicated by a dotted amplifier 67.

The output signal from the coincidence "and" gate 59 is an actuation signal $\phi_9$ that is provided depending upon the coincidence and polarity of the respective strobe signal $\phi_7$ and the information signal $\phi_8$ arriving at the inputs of the coincidence "and" gate 59 and governed by the conventional rules of binary logic, in this example. Each actuation signal $\phi_9$ that is provided by each coincidence circuit is coupled to a separate actuated device such as the electromechanical actuator 69. Thus, if, for example, push-type actuators are to be utilized at various points along a conveyor belt, a separate actuated device would be required to be disposed at these points to push whatever is so selected off of the belt at these predetermined points.

Figure 2:
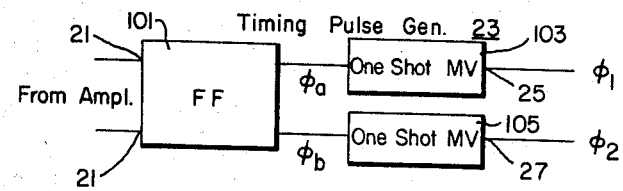
FIG. 2 is a schematic block diagram of the timing pulse generator portion of the system of FIG. 1.
Figure 3:
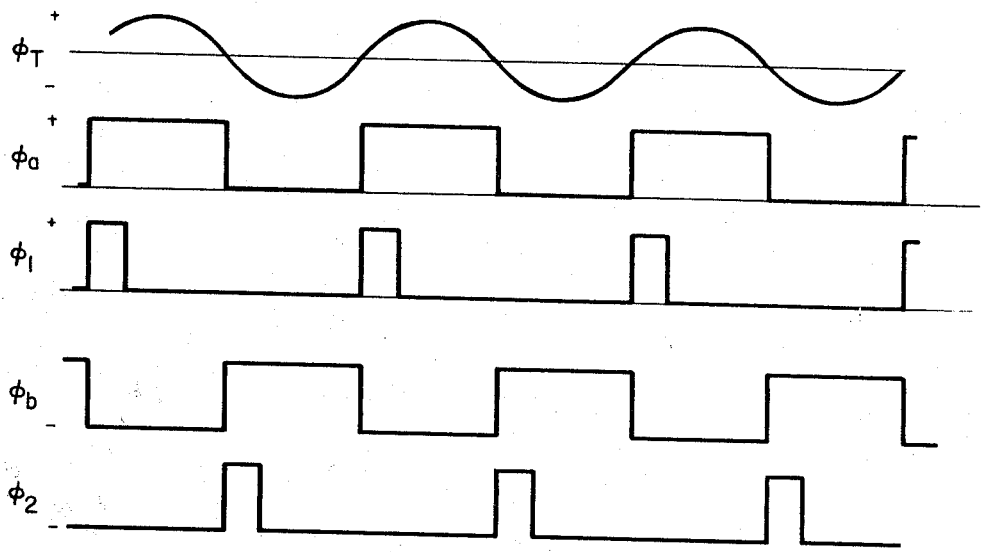
FIG. 3 is a schematic diagram of waveforms of voltage as a function of time for explaining the operation of the timing pulse generator of FIG. 2.

Before the over-all operation of the system according to the invention is described, major component parts will be explained. Thus, FIG. 2 illustrates a timing pulse generator that may be utilized. Here, the inputs 21 of the timing pulse generator 23 couple the timing signal $\phi_T$ from the amplifier 19 to a conventional flip-flop 101 having opposite polarity signals $\phi_a$ and $\phi_b$. Each of these signals is coupled to a respective one shot multivibrator 103 and 105 to provide the timing signals $\phi_1$ and $_2$, respectively. The operation of the timing pulse generator can best be explained by making reference to the schematic diagram of waveforms of voltage as a function of time of FIG. 3. It can be seen that the flip-flop 101 follows the input sine wave signal $\phi_T$ and provides square wave shaped signals $\phi_a$ and $\phi_b$ that have substantially the same length as the period of each half-cycle of the sine wave signal $\phi_T$. For better useful timing characteristics, the length of these square wave signals is reduced by the respective one shot multivibrators 103 and 105 as can be seen in FIG. 3. Thus, it can be seen that the timing pulse generator 23 produces similarly poled and relativelyy narrow square wave timing signals $\phi_1$ and $\phi_2$ which are substantially 180° out of phase with each other.

Figure 4:
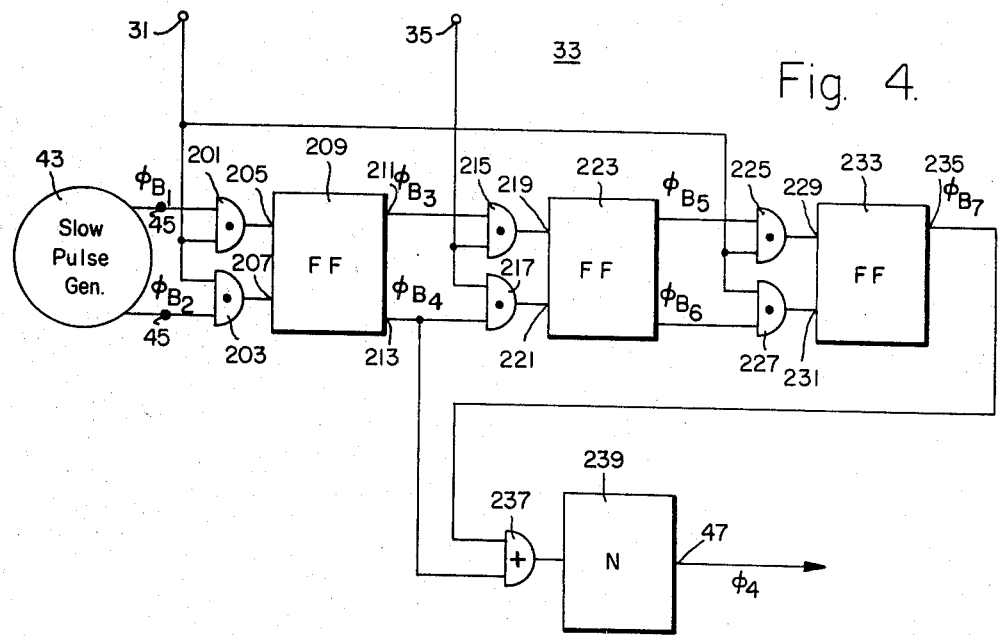
FIG. 4 is a schematic block diagram of a single pulse forming circuit portion of the system of FIG. 1.

The schematic block diagram of FIG. 4 illustrates the single pulse forming circuit 33 of FIG. 1. As shown in FIG. 1, this circuit is operating in an "addition" mode where each pulse generated by the slow pulse generator 43 is "added" to the continuing chain of $\phi_1$ timing pulses at a point approximately equidistant from the preceding and following timing pulse so that the counter 49 will have no trouble in recording its presence. However, this same basic circuit may be used to provide a "subtraction" function by subtracting one of the $\phi_1$ timing pulses each time a slow pulse signal $\phi_{B1}$ and $\phi_{B2}$ is produced by the slow pulse generator 43. This is accomplished by making the connections shown in FIG. 1 as dotted lines with respect to the single pulse forming circuit 33 and by breaking the connections shown by solid lines at the points indicated by the X's. This includes coupling the anticoincidence signal $\phi_4$ through an inverter stage 151 to provide a subtracting signal $\phi_s$ that along with the $\phi_1$ timing signal $\phi_1$ is coupled to a subtractor "and" gate 153 to provide the counting signal $\phi_6$ to the counter 49.

The signal pulse forming circuit shown in FIG. 4 comprises a first and second "and" gate input elements 201 and 203. Each of these input elements has one input 45 coupled to a respective slow pulse signal $\phi_{B1}$ and $\phi_{B2}$ while the other input of these elements are connected together and to the input terminal 31. The output terminal of each of the "and" gates 201 and 203 is connected to separate input terminals 205 and 207 of a conventional first flip-flop 209. The flip-flop 209 has a first output terminal 211 providing an output signal $\phi_{B3}$ and a second output terminal 213 providing an output signal $\phi_{B4}$ that is, of course, inversely related to the signal $\phi_{B3}$. These output signals are in turn coupled through respective input terminals of third and fourth input elements or "and" gates 215 and 217 to respective input terminals 219 and 221 of a second flip-flop 223 when there is present a suitable timing signal from the input terminal 35 on the other input terminal of the third and fourth input "and" gates.

In a manner similar to the first flip-flop 209, the second flip-flop 223 provides output signals $\phi_{B5}$ and $\phi_{B6}$ through fifth and sixth "and" gates 225 and 227 to respective input terminals 229 and 231 of a third flip-flop 233 when a suitable timing signal is present at the input terminal 31. The output terminal 235 of the third flip-flop 233 is connected to one of the two inputs to an "or" gate 237 while the other input thereof is connected to the second output terminal 213 of the first flip-flop 209. Thus, at the "or" gate 237 input terminals there may be presented the signals $\phi_{B4}$ and $\phi_{B7}$. The "or" gate 237 is in turn connected to an inverter circuit 239 which is the source of the anticoincident signal $\phi_4$ in the "addition" mode of operation previously described.

Figure 5:
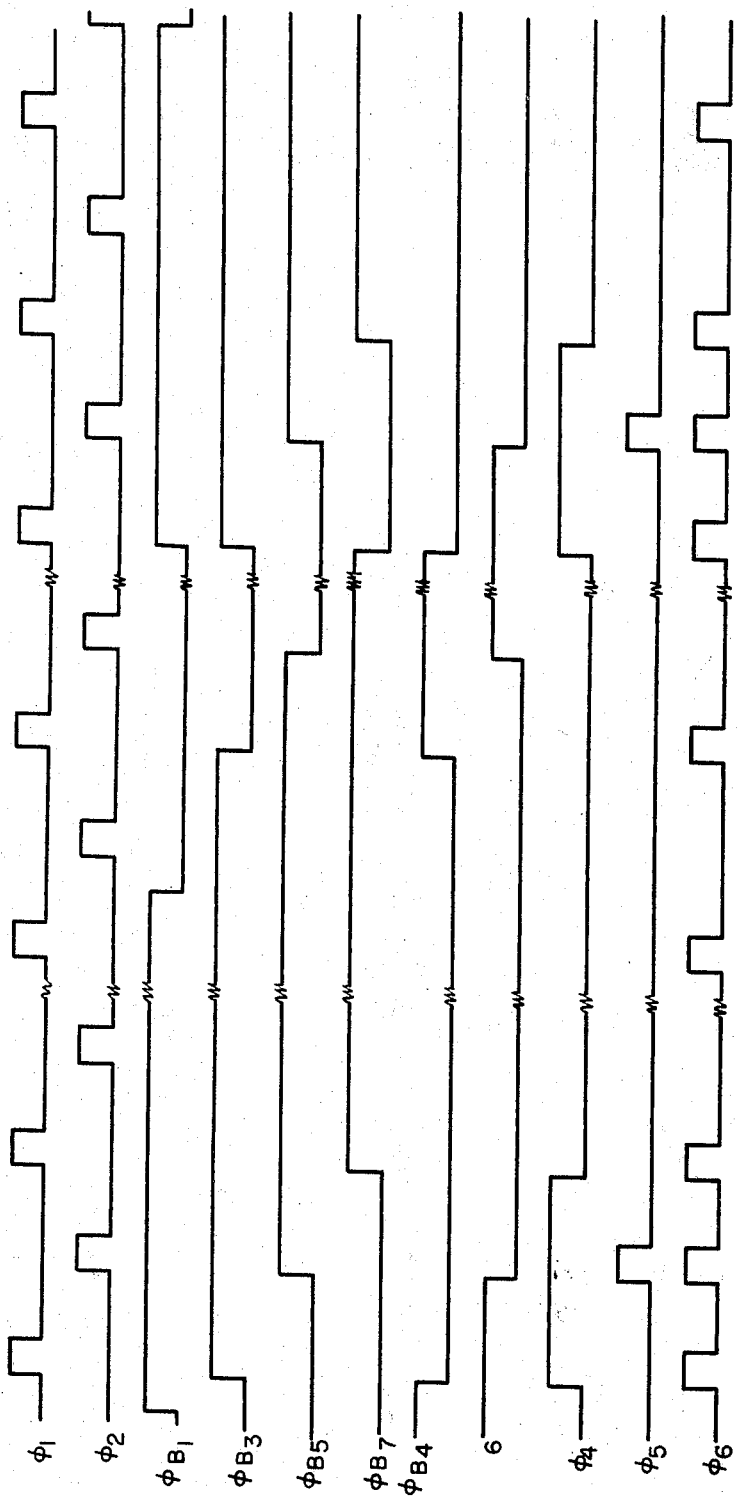
FIG. 5 illustrates waveforms of voltage as a function of time for explaining the operation of the single pulse forming circuit of FIG. 4 in the addition mode.

The operation of the single pulse forming circuit and the anticoincidence circuitry relating thereto may be best understood by referring to the waveforms of voltage as a function of time illustrated in FIG. 5. This diagram describes the inter-relationship between the various elements of the circuit functioning in the "addition" mode. Considering that all higher level voltages are true and all lower level voltages are false, it can be seen that the two timing signals $\phi_1$ and $\phi_2$ control the various flip-flops in the circuit. Thus, whenever the slow pulse generator 43 produces a true slow speed signal $\phi_{B1}$ (because of movement of a conveyor belt, for example) that is coincident in time with a true $\phi_1$ timing signal at the first "and" gate 201, the first flip-flop 209 will be set to produce a true first output signal $\phi_{B3}$ at the first output terminal 211. At the same instant, of course, a false second output signal $\phi_{B4}$ is presented at the second output terminal 213. The resetting of these flip-flops and others later to be described is accomplished in a conventional manner easily understood from the waveform diagrams and, therefore will not be described in detail.

In a manner similar to the setting of the first flip-flop 209, the second flip-flop 223 is set when there is a coincidence at the third "and" gate 215 of a true $\phi_2$ timing signal and the true first output signal $\phi_{B3}$. There is thus provided a true third output signal $\phi_{B5}$ coupled to the fifth "and" gate 225 and a false fourth output signal $\phi_{B6}$ coupled to the sixth "and" gate 227. Again, with the coincidence at the fifth "and" gate 225 of the true third output signal $\phi_{B5}$ and a true $\phi_1$ timing signal, the third flip-flop 233 will be set so that a true fifth output signal $\phi_{B7}$ is produced and coupled to the "or" gate 237. This "or" gate 237 is the non-exclusive type and functions to provide at its output a false signal whenever both of its inputs are false, but a true signal if either or both of its inputs are true. The inverter 239 will, of course, invert a false input to a true output and vice versa. Thus, at the output terminal 47 of the single pulse forming circuit 33 a true anticoincidence signal $\phi_4$ will appear and be coupled to the "and" gate 37 only when the second output signal $\phi_{B4}$ and the fifth output signal $\phi_{B7}$ are both false at the same time. It can thus be recognized that the function of the single pulse forming circuit 33 as just described is to provide a true anticoincidence signal $\phi_4$ whenever a slow speed signal $\phi_{B1}$ is produced, which anticoincidence signal always commences at the time of the next occurring $\phi_1$ timing signal and always terminates at the time of the next subsequent $\phi_1$ timing signal, no matter the duration of the slow speed signal from the slow pulse generator 43.

FIG. 5 also describes the inter-relationships of the anticoincidence signal $\phi_4$, the precession signal $\phi_5$ and the counting signal $\phi_6$. Thus, only when there is a coincidence of a true $\phi_2$ timing signal and a true anticoincidence signal $\phi_4$ at the inputs to the anticoincidence "and" gate 37 will the precession signal $\phi_5$ be true. Therefore, it should be clear that the function of the anticoincidence circuit is to allow the insertion of a pulse into the chain of $\phi_1$ timing signals (whenever a slow speed signal is generated) only at the time a true $\phi_2$ timing signal is present. This guarantees that the added pulses are inserted substantially equidistant in time between $\phi_1$ timing signals so that there will be no possibility that the counter 49 will miss a count. For example, note in FIG. 5 that true counting signals $\phi_6$ are present whenever there is a true $\phi$ timing signal and whenever there is a true counting signal $\phi_5$. This is the case because in the circuit of FIG 1 the $\phi_1$ timing signal and the counting signal $\phi_5$ are coupled to the input of the "or" gate 29.

With regard to the "subtraction" mode of the system, it should be easily understood that by reversing the $\phi_1$ and $\phi_2$ timing signals to the input terminals 31 and 35 of the single pulse forming circuit 33 a true $\phi_4$ pulse will occur only at the time a true $\phi_1$ timing signal is present (after the occurrence of as low speed signal $\phi_{B1}$) and false at all other times. This signal will be inverted by the inverter 151 to provide a subtraction signal $\phi_s$ that is coupled along with the $\phi_1$ timing signal to the inputs of the subtraction "and" gate 153. Now, the subtraction signal $\phi_s$ will be true at all times except after the occurrence of a slow speed signal $\phi_{B1}$ and thus the "and" gate 153 will pass $\phi_1$ timing signals to the counter 49 except when the subtraction signal $\phi_s$ is false. This, if it occurs at all, must occur at the time $\phi_1$ is present at the "and" gate 153 because of the timing of the single pulse forming circuit as described above with reference tot he related dated connection portion of FIG. 1, i.e., reversing the connections to the $\phi_1$, $\phi_2$ signals.

As can be seen from FIG. 1, the counting signal $\phi_6$ is coupled to the first flip-flop $FF_1$ of the binary counter 49. This first stage is coupled in turn to the second flip-flop $FF_2$ and that to the next and so on. Each flip-flop stage has two output terminals, one of which may be selected by the switches $S_1$–$S_8$ to be coupled to the multiple input of the "or" gate 51. This selection is governed by a particular predetermined count that is desired to be forwarded to the inverter 53 to form the strobe signal $\phi_7$. In this example, there are eight flip-flop stages and thus the counter 49 wil count 256 $\phi_6$ pulses before it recycles. By proper selection of the switch positions, any one pulse of the 256 pulses per cycle can be selected to be the strobe signal $\phi_7$ by each strobe pulse forming circuit. This can best be explained by stating first that the strobe pulse forming circuits will provide a true strobe signal $\phi_7$ only when all of the inputs to the "or" gate 51 are false; if any of these inputs are true, the strobe signal will be false. Thus, by using binary logic, it can be seen that this condition of all false outputs of the counter 49 can be selected by the switches $S_1$–$S_8$. For example, the first flip-flop stage $FF_1$ will represent the units digit and the second flip-flop $FF_2$ will represent the 2 digit. The third flip-flop will be 4; the fourth will be 8; the fifth, 16; the sixth, 32; the seventh, 64; and the last, 128. Thus, the binary selection as shown by the position of the switches in FIG. 1 is 1 plus 4, plus 16, plus 64 or a total of 85. In this case, at the time that the 85th true counting signal pulse appears at the counter 49 after its last reset, all the inputs of the "or" gate 51 would be low and a true strobe signal pulse $\phi_7$ will be coupled to the coincidence "and" gate 59. Of course, each strobe pulse forming circuit has its own set of selection switches so that a different count may be selected for it.

The cyclic storage device 11, on the other hand, must through its decoder circuit 61 be able to provide a true information signal pulse $\phi_8$ at any of the counts that the counter can register per cycle of its operation. In this case, the decoder should be able to provide a true $\phi_8$ pulse to coincide with a true $\phi_7$ pulse a the inputs to the coincidence "and" gate 59. However, the main consideration above all is that both the cyclic storage device and the cyclic electronic circuit recycle in the same amount of time so that in the absence of precession true $\phi_7$ pulses and true $\phi_8$ pulses will remain stationary in time with respect to each other. This can be clearly seen in FIG. 6 before the occurrence of the true $\phi_{B1}$ signal pulse. In the case where, as shown, the cyclic memory is a drum type memory with a timing track, there must be as many $\phi_1$ timing pulses read in any revolution of the drum as the total number of pulses the counter can count before it recycles. In other words, the counter must recycle once for each revolution of the drum.

The cyclic memory drum 11 will accordingly have as many memory tracks as will be required to produce (after decoding) an information signal $\phi_8$ that will match any of the possible timing positions possible for the strobe $\phi_7$ signal at each coincidence circuit taking into consideration that the binary decoder provides $2^N$ possible outputs for N inputs. Thus, where there are eight actuation devices in a system, then only three tracks will be needed and not eight as is required by most prior art systems.

Figure 6:
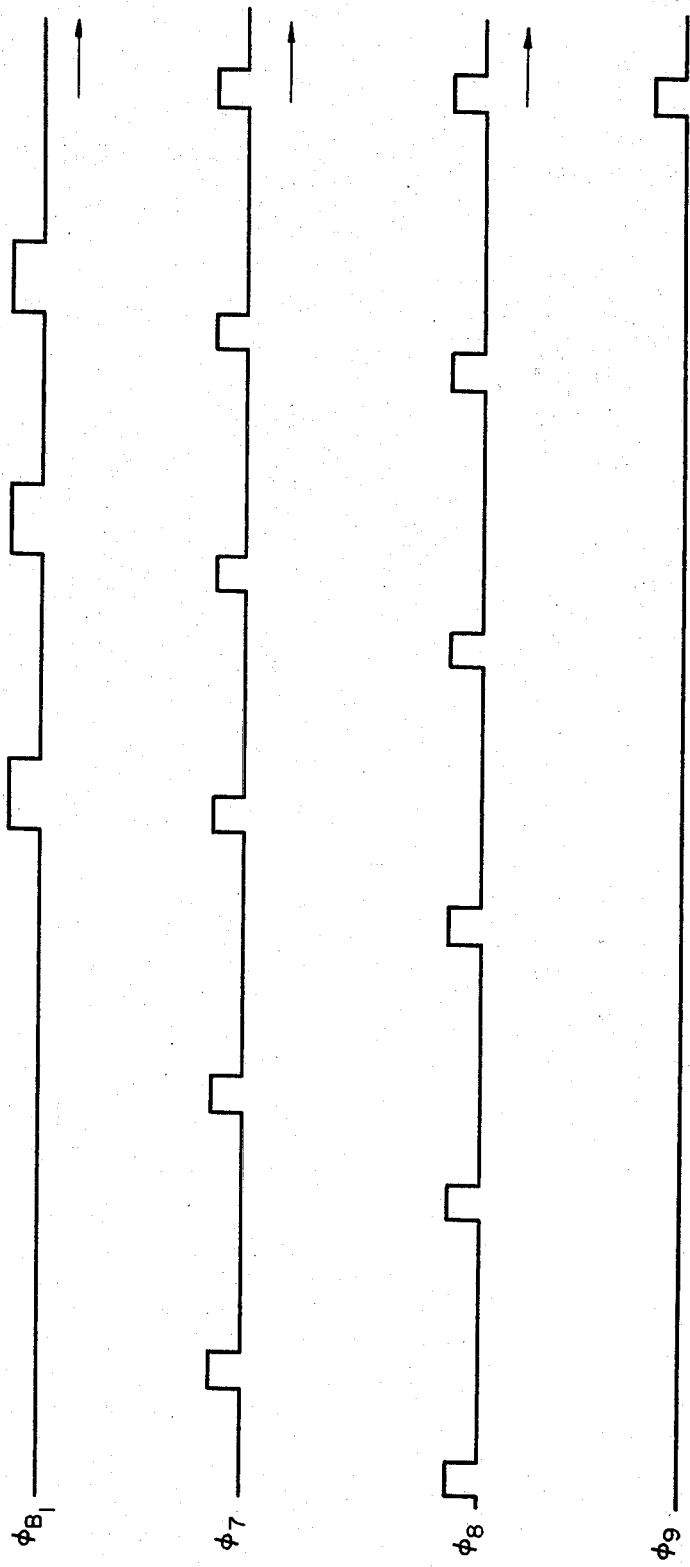
FIG. 6 is a schematic diagram of waveforms of voltage as a function of time for explaining the operation of the system of FIG. 1.

The precession that occurs between the strobe signal $\phi_7$ and the information signal $\phi_8$, in order to obtain a coincidence of true pulses of these signals at any particular coincident circuit, can best be explained by again making reference to FIG. 6. Here, it can be seen that the information signal pulses $\phi_8$ are always equally spaced in time as is the case with the strobe signal pulses $\phi_7$ before the occurrence of a slow speed signal pulse $\phi_{B1}$. However, when each $\phi_{B1}$ pulse does appear, the distance or time between consecutive strobe pulses $\phi_7$ lessens until the $\phi_7$ and $\phi_8$ pulses coincide in time. When this happens at a particular coincident "and" gate 59, at true actuation signal pulse $\phi_9$ will be coupled to an associated actuator 69. Thus, in the case of a conveyor belt for example, when the belt has moved a predetermined distance and the slow pulse generator 43 produced a certain number of slow speed signal pulses $\phi_{B1}$, a package may be pushed from its position on the belt onto another conveyor or onto a dock area for transportation to its ultimate destination.

The more precise the positioning of each actuator along the line of travel of the belt is desired, the higher the total number of timing signal pulses $\phi_1$ must be generated and counted per cycle of operation of the counter and, of course, the memory. In other words, the total number of timing pulses per cycle is governed by the desired length of each increment of distance along the conveyor. For example, where the conveyor is 256 feet in length and there are 256 pulses counted by the counter each cycle of its operation, then the increment of length in which any actuator can be placed is 1 foot. Thus, the closest that any two actuators can be placed is 1 foot.

Thus, there has been described an improved synchronized control system that synchronizes electronic circuitry with slow moving equipment such as, for example, conveyor belts and the like. It has been shown that this system is simpler, cheaper and smaller than systems heretofore available to produce the same result and does not use a slow speed storage device.

Although specific embodiments of the invention have been described in detail, other organizations of the embodiments shown may be made within the spirit and scope of the invention.

Accordingly, it is intended that the foregoing disclosure and drawings shall be considered only as illustrations of the principles of this invention and are not to be construed in a limiting sense.

What is claimed is:

1. A synchronized control system to control electromechanical actuators associated with a relatively slow speed mechanical device, comprising:

relatively high speed cyclic storage means having a cyclic cycle of operation for providing storage information signals in accordance with predetermined information stored therein;

relatively high speed cyclic electronic circuit means for generating strobe pulses for any of its states corresponding to any desired points in the storage cycle of said cyclic storage means;

relatively slow speed pulse generator means coupled to said slow speed mechanical device for generating slow speed pulses related to the movement of said mechanical device;

timing pulse circuitry means coupled to said slow speed pulse generator means and responsive to said slow speed pulses, to said cyclic storage means and to said cyclic electronic circuit means for providing a synchronous timing relationship therebetween, for providing timing pulses to said cyclic electronic circuit means and for causing a precession of said strobe pulses with respect to said storage cycle of said cyclic storage means by controlling the number of said timing pulses coupled to said cyclic electronic circuit means in accordance with said slow speed pulses; and actuation means coupled to said cyclic electronic circuit means and to said cyclic storage means and responsive to the relationship of said storage information signals and said strobe pulses for providing actuation signals to be coupled to said electromechanical actuators.

2. A synchronized control system according to claim 1, wherein said cyclic storage means includes a plurality of stored information segments recorded in a cyclic memory device for providing said information signals.

3. A synchronized system according to claim 1, wherein said timing pulse circuitry means includes timing pulse generator means for generating said timing pulses.

4. A synchronized control system according to claim 3, wherein said timing pulse circuitry includes additive single pulse forming circuit means for adding timing pulses to said timing pulses generated by said timing pulse generating means in direct relationship to the number of said slow speed pulses produced by said slow speed generator means.

5. A synchronized control system according to claim 3, wherein said timing pulse circuitry includes subtractive single pulse forming circuit means for subtracting from said timing pulses coupled to said cyclic electronic circuit means in direct relationship to the number of said slow speed pulses produced by said slow speed generator means.

6. A synchronized control system according to claim 1, wherein said timing pulse circuitry means includes a timing pulse generator producing a continuous train of said timing pulses and a second continuous train of timing pulses having a phase relationship to said mentioned timing pulses of approximately 180°; a single pulse forming circuit having first input terminals coupled to said slow pulse generator means and second input terminals coupled to said timing pulse generator and responsive to said trains of timing pulses and output terminals whereat there is provided an anticoincident pulse signal; an "and" gate having a first input coupled to said timing pulse generator and responsive to said second train of timing pulses and a second input coupled to said timing pulse generator and responsive to said first mentioned train of timing pulses and an output whereat there is provided a precession pulse signal when there is a coincidence at said first and second inputs of said "and" gate of a pulse from said second train of timing pulses and a pulse from said anticoincident pulse signal; and an "or" gate having a first input coupled to said timing pulse generator and responsive to said first mentioned train of timing pulses and a second input coupled to said output of said "and" gate and an output coupled to said cyclic electronic circuit means to supply counting signal pulses for each of said timing pulses and the precession signal pulses.

7. A synchronized control system according to claim 1, wherein said cyclic electronic circuit means includes a binary counter comprising a plurality of binary stages coupled in series and a plurality of strobe pulse forming circuits, each coupled in a predetermined manner to a different one of said binary stages.

8. A synchronized control system according to claim 1, wherein said actuation means includes a plurality of electromechanical actuators and a coincident circuit for each of said actuators coupled to corresponding ones of said actuators, said coincident circuits having a first input terminal coupled to said cyclic electronic circuit means and responsive to said strobe pulses and a second input terminal coupled to said cyclic storage means and responsive to said storage information signals and providing actuation signals to corresponding ones of said actuators when there is a timing and polarity coincidence between said strobe pulses and said stoarage information signals at said input terminals thereof.

9. A synchronized control system according to claim 8, wherein said coincident circuit is an "and" gate.

10. A synchronized control system according to claim 1, wherein said cyclic storage means includes a drum memory of a binary decoder thereto.

References Cited
UNITED STATES PATENTS

| | | |
|---|---|---|
| 2,475,245 | 7/1949 | Leaver et al. |
| 3,000,519 | 9/1061 | Purnell. |
| 3,105,601 | 10/1963 | Smoll _____ 198—38 X |
| 3,328,597 | 6/1967 | De Witt et al. _____ 307—40 |

ROBERT K. SCHAEFER, *Primary Examiner.*

T. B. JOIKE, *Assistant Examiner.*

U.S. Cl. X.R.

214—11